Figure 1:
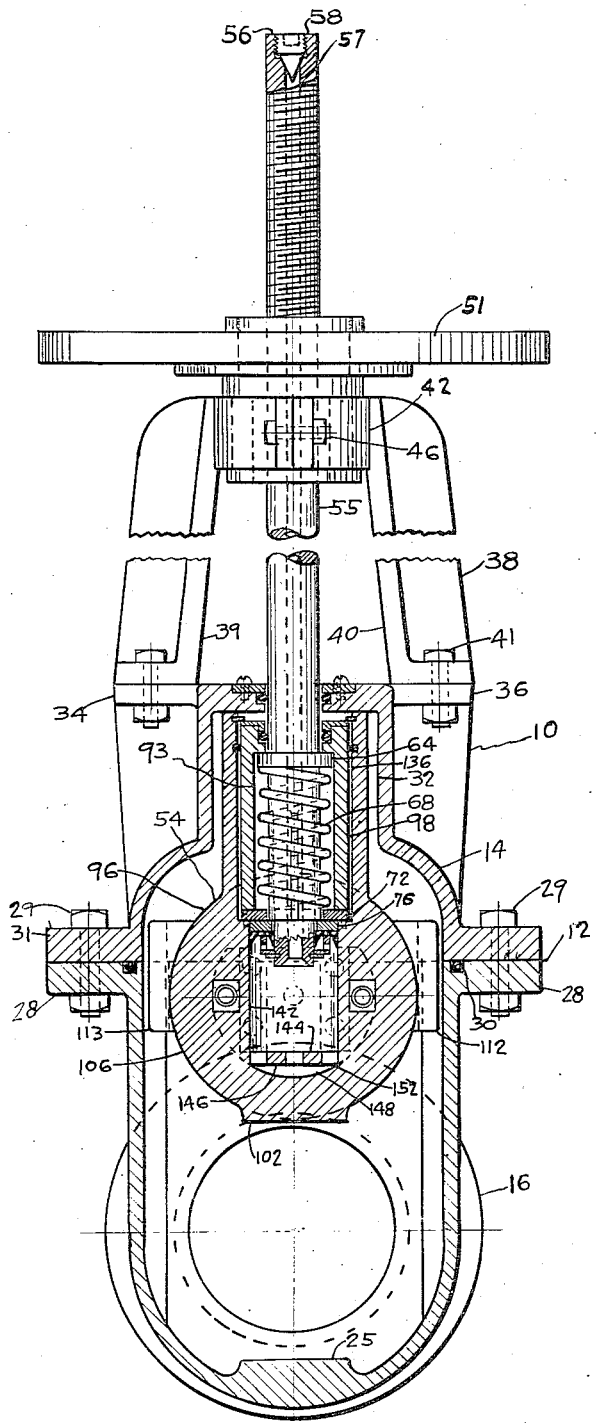
Figure 6:
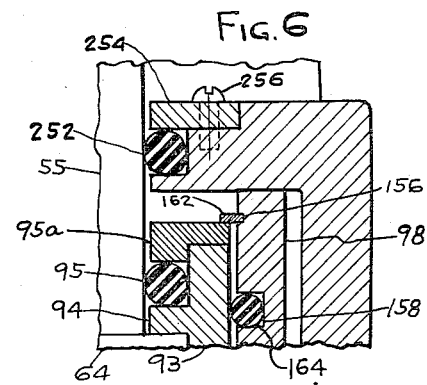

March 4, 1958 — A. R. TRUITT — 2,825,528
GATE VALVE WITH HYDRAULIC EXPANDING GATE
Filed May 1, 1953 — 3 Sheets-Sheet 1

INVENTOR.
BY ARTHUR R. TRUITT
ATTYS George Lipkin
Lee S. Huntzberger

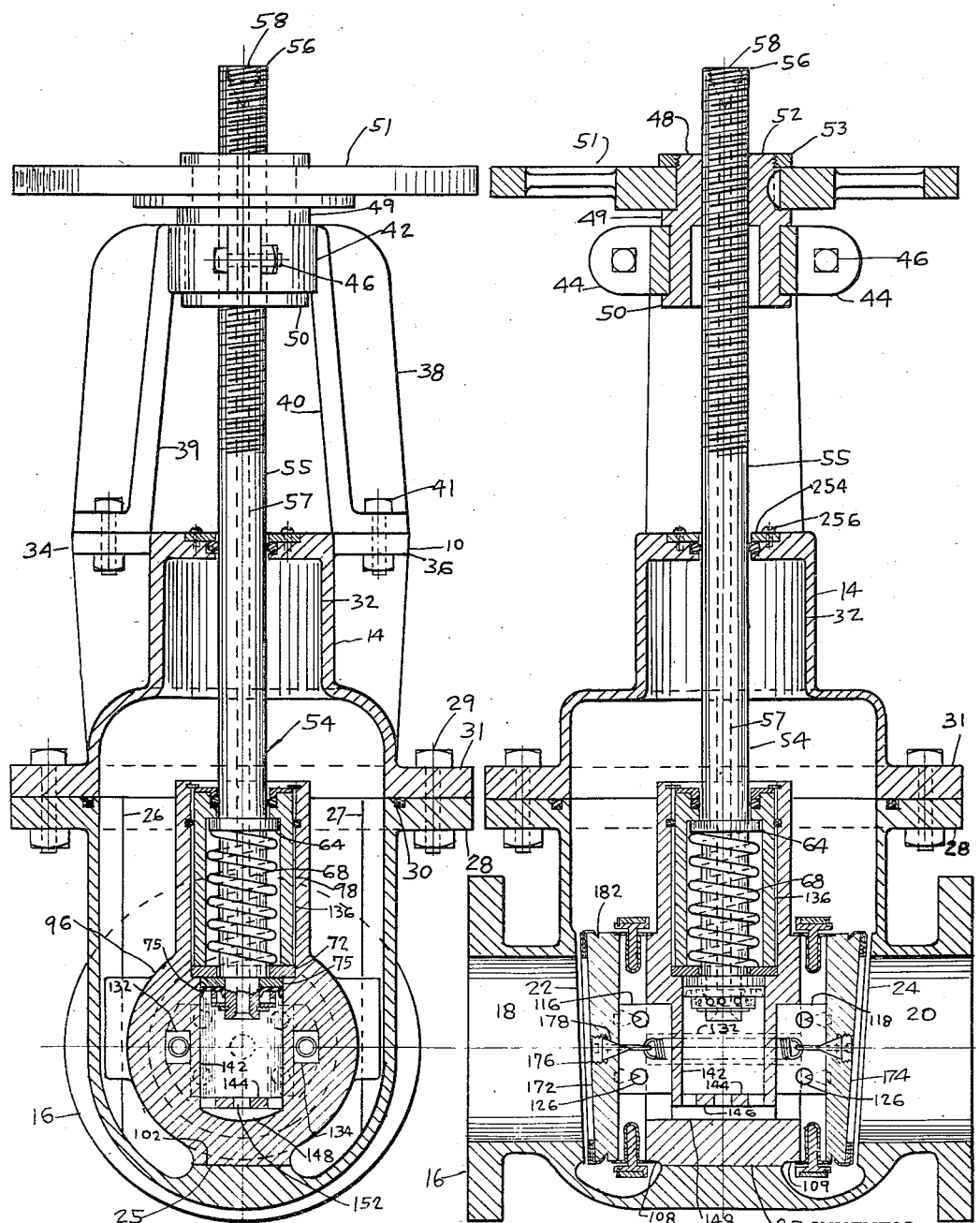

March 4, 1958  A. R. TRUITT  2,825,528
GATE VALVE WITH HYDRAULIC EXPANDING GATE
Filed May 1, 1953  3 Sheets-Sheet 3
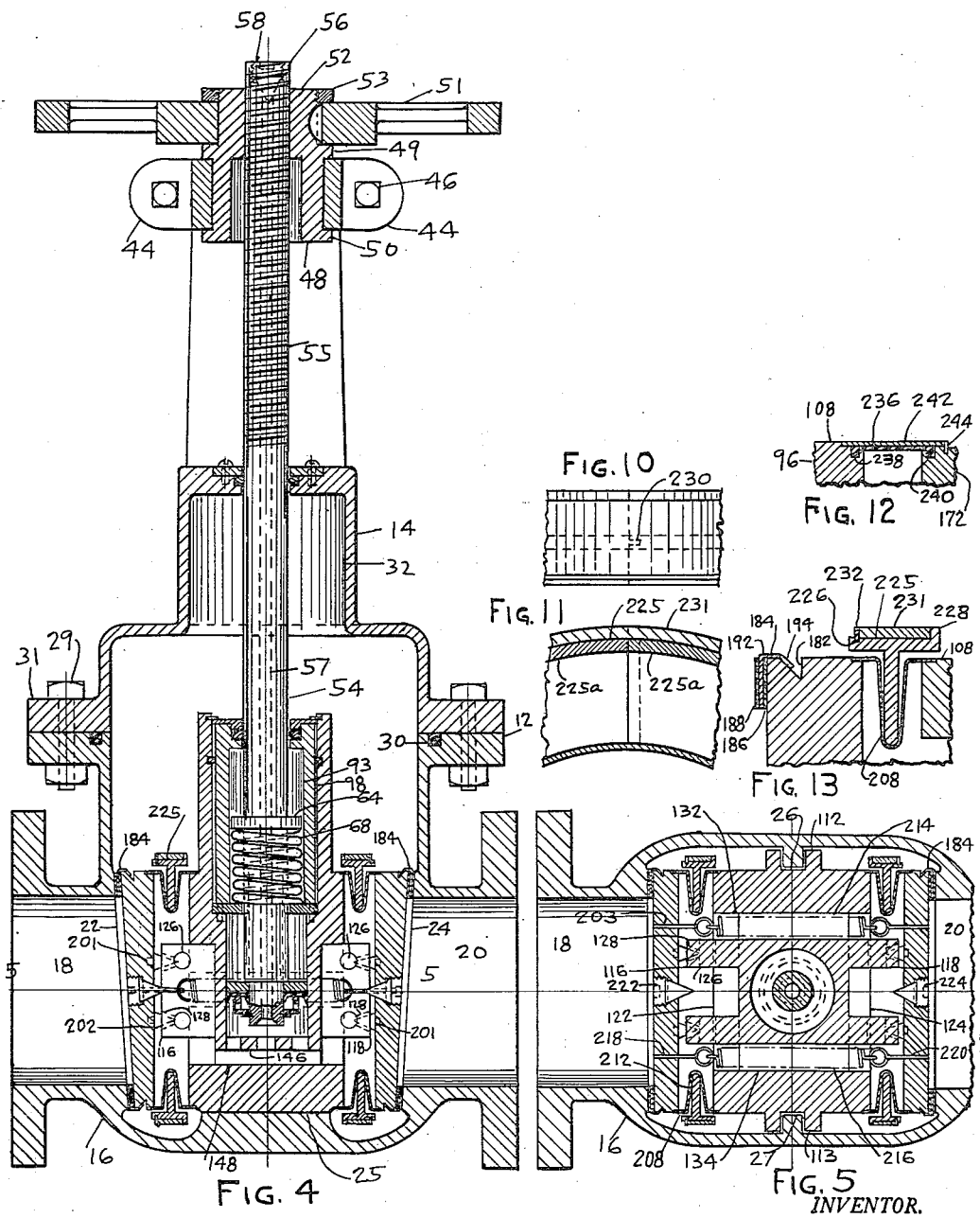
INVENTOR.
BY ARTHUR R. TRUITT.

United States Patent Office 2,825,528
Patented Mar. 4, 1958

2,825,528

GATE VALVE WITH HYDRAULIC EXPANDING GATE

Arthur R. Truitt, New York, N. Y.

Application May 1, 1953, Serial No. 352,600

9 Claims. (Cl. 251—175)

(Granted under Title 35, U. S. Code (1952), sec. 266)

The invention described herein may be manufactured and used by or for the Government of the United States of America for governmental purposes without the payment of any royalties thereon or therefor.

This invention relates to improvement in gate valves with hydraulic expanding gates and more particularly to gate valves with hydraulic expanding gates for seating in the valve to first terminate the flow of fluid and subsequently upon expanding the gate faces into firm seating engagement with the valve seats to terminate any leakage of fluid in the valve.

The valve of this invention includes a gate having a pair of movable gate faces. The gate faces move due to the pressure created within the gate assembly by the displacement of hydraulic fluid included within the gate assembly. Normally the gate faces are biased to a retracted position relative to the gate assembly. However if the handwheel for the gate valve is rotated by an amount exceeding that necessary to seat the gate assembly in the valve body the valve stem is caused to move relative to the body of the gate assembly displacing hydraulic fluid therein and as a consequence thereof increasing the pressure within the gate assembly to cause the gate faces to move outwardly relative to the gate assembly. Novel replaceable seating rings are provided for each of the gate faces. The replaceable seating rings are in part resilient to provide good seals. The biasing means for retracting the gate faces whenever the hydraulic fluid in the gate assembly is not under pressure promotes good operation. Novel means are also provided for preventing the resilient means that movably support the gate faces relative to the body of the gate assembly from expanding radially outwardly under the influence of hydraulic pressure created within the gate assembly during valve operation. Provision is made throughout the gate assembly for venting trapped air at the time the gate assembly is charged with hydraulic fluid.

An object of this invention is to provide an improved gate valve having a hydraulic expanding gate.

A further object is to provide a gate valve with an hydraulic expanding gate face wherein retraction of the expanding gate face is ensured during the seating and unseating of the gate assembly.

A further object is to provide a gate valve with a hydraulic expanding gate that can be easily assembled and disassembled for repair.

A further object is to provide replaceable seating rings for gate valves.

A further object is to provide an improved resilient means for attaching expanding gate faces to the gate assembly of a valve.

Figure 8:
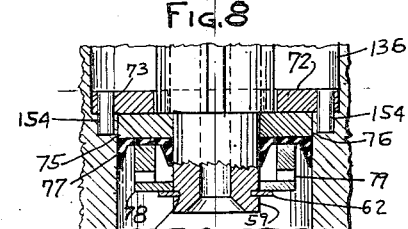
Figure 9:
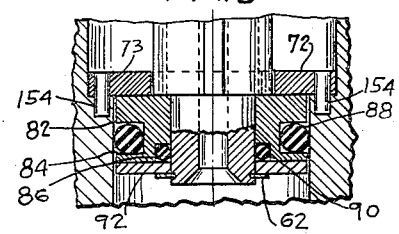

Other objects and many of the attendant advantages of this invention will be readily appreciated as the same becomes better understood by reference to the following detailed description when considered in connection with the accompanying drawings wherein:

Fig. 1 is a plan view of the valve of this invention with parts shown in section and parts shown in elevation and with the gate assembly in completely retracted position, Fig. 2 and Fig. 3 are plan views of the valves of this invention with parts shown in section and parts shown in elevation and with the gate assembly seated in the valve body, Fig. 4 is a sectional view similar to Fig. 3 with the gate in expanded condition, Fig. 5 is a cross-sectional view taken on the planes 5—5 of Fig. 4, Figs. 6, 8, 10, 11, and 13 are enlarged fractional views of different portions of the invention, and Fig. 9 and Fig. 12 are enlarged sectional views of modifications of the piston assembly and the resilient gate face attaching means, respectively, that may be included in the valve in place of the piston assembly and the resilient gate face attaching means included therein.

The valve 10 (Figs. 1–3) comprises a valve housing 12 of two sections, a bonnet 14 and a body section 16. Valve housing 12 is similar to valve housings conventionally used for hydraulic gate valves. The body section 16 is formed with a pair of aligned ports 18 and 20. The valve seats 22 and 24 bordering the ports 18 and 20, respectively, inside the body section 16 are conventionally finished to provide smooth even surfaces. The valve seats 22 and 24 define a pair of inclined planes symmetrically disposed about a central transverse plane through the body section 16. At the bottom of the inside of the body section there is provided a flat raised surface 25 serving as a stop for the gate. The inside of the body section 16 is also provided with a pair of opposed guide ribs 26 and 27 (Figs. 1 and 5) to restrict the gate to reciprocating movement. The flange 28 of the body section 16 is bored to provide bolt holes for receiving bolts 29, and is also formed with an annular groove 30 to receive packing material such as O ring.

The bonnet 14 has a flange 31 which is bored to provide bolt holes corresponding to the bored bolt holes in flange 28 of body section 16 whereby the bonnet is secured in sealed relationship to the body section 16 by the plurality of bolts 31 and the packing in groove 30. The bonnet is provided with a cylindrical axial extension 32 of sufficient length to permit the gate to be completely withdrawn from the ports 18 and 20 as shown in Fig. 1. Extending transversely from opposite sides of the top of bonnet 14 and integral with the bonnet are supports 34 and 36. The supports 34 and 36 bored to form bolt holes.

A yoke 38 is fixedly supported atop the bonnet 14. The yoke includes a pair of spaced brackets 39 and 40 bored to form bolt holes corresponding to the bolt holes in supports 34 and 36. The brackets 39 and 40 are fixedly secured to supports 34 and 36 by means of bolts 41. The yoke 38 provides a circular yoke sleeve housing 42. The two semicircular halves of the sleeve housing 42 terminate at each of their semicircular ends in an ear 44 (Fig. 3). The ears are formed with bolt holes for receiving bolts 46 through the aligned bores in the ears 44 for fastening the halves of the sleeve housing 42.

A yoke sleeve 48 is rotatably mounted in the yoke sleeve housing 42. The yoke sleeve 48 includes a pair of end flanges 49 and 50 axially spaced by a distance somewhat greater than the length of the sleeve housing 42 of the yoke 38. The diameter of the yoke sleeve 48 between its flanges 49 and 50 is such that it can rotate freely in the sleeve housing 42. Secured to the yoke sleeve 48 and rotatable therewith is a handwheel 51. The handwheel 51 is slipped over the projecting end 52 of the yoke sleeve 48, keyed to the sleeve, as seen in Fig. 3, and clamped by means of a yoke sleeve nut 53 against the flange 49. The handwheel 51 and the yoke sleeve 48 are rotatable as a unit in the sleeve housing 42. The projecting end 52 of the yoke sleeve 48 is internally threaded.

The gate assembly 54 of the valve comprises a stem 55 which is threaded from one end 56 for one-quarter to one-third its length for cooperation with the threads in the yoke sleeve 48. The stem 55 is bored to provide an axial passage 57 therethrough with an internally threaded portion of increased diameter at one end for receiving a sealing plug 58 (Fig. 1). The axial passage 57 is formed for use in filling and venting the gate assembly in a manner subsequently described. The end 59 of the stem 55 (see Fig. 8) is of reduced outside diameter. Immediately adjacent the free end of the reduced end portion 59 an annular groove 60 is cut in the stem 55 to receive a snap ring 62. At a predetermined distance from the reduced end 59 of the stem 55 a flange 64 is formed integral with or is fixedly secured in any suitable manner to the stem 55. Four equally spaced longitudinally extending slots 66 (Fig. 7) are milled or otherwise formed in the stem 55; the slots extend from below the flange 64 to the reduced end portion 59 of the stem 55. The purpose of the slots 66 is to restrict the stem 55 to reciprocating movement.

A compression coil spring 68 is provided on the stem 55; one end of the coil spring 68 bears against flange 64. A compression-thrust and stem-locking washer 72 (Figs. 7 and 8) is provided on the stem 55 and provides a bearing surface for the other end of the compression spring 68. The compression-thrust and stem-locking washer 72 has four equally spaced, radial, inwardly extending lips 74 (Fig. 7). The lips 74 of the washer 72 are designed for registration with the four longitudinally extending slots 66 of stem 55. There is sufficient clearance between the lips 74 and the walls of slots 66 so that the stem 55 can reciprocate freely relative to the washer 72. The washer 72 is also formed with four equally spaced holes 73.

Mounted upon the reduced end portion 59 of the stem 55 is a piston assembly 75 (Fig. 8). The piston assembly 75 includes a washer 76 bearing against the shoulder defining the one limit of the reduced end portion 59 of the stem 55. A ring 77 of rubber or rubber-like material, channel-shaped in cross section, bears against the washer 76. The channel-shaped ring 77 is held in place by means of a cup-shaped retaining ring 78. The rim of the cup-shaped retaining ring 78 bears against the trough of the channel-shaped ring 77. A snap ring 62 retains the piston assembly 75 on the reduced end portion 59 of the stem 55. The cup-shaped retaining ring 78 is formed with a plurality of passages 79 extending radially through the wall of the cup-shaped retaining ring 78. The passages 79 serve the function of venting trapped air from within the piston assembly when the gate assembly is being charged with hydraulic fluid.

A modified piston assembly adapted to be used in the valve 10 in place of the piston assembly 75 is shown in Fig. 9. The modified piston assembly comprises a cylindrical member 82 which is adapted to abut the shoulder defining the limit of the reduced end portion 59 of the stem 55. Cylindrical member 82 is formed with a pair of annular grooves, namely, an outside annular groove 84 and an inside annular groove 86. The annular grooves 84 and 86 are for seating packing material such as O rings 88 and 90, respectively. The cylindrical member 82 including the assembled O rings 88 and 90 is retained upon the stem 55 by means of a piston retaining washer 92 and a snap ring 62.

A cylindrical housing 93 (Fig. 1 and Fig. 6) is provided for compression spring 68 on stem 55. The housing 93 includes a flange 94; the flange 94 is designed to seat a packing ring such as an O ring 95. The flange 94 of the spring housing 93 abuts the flange 64 of the stem 55.

The gate assembly 54 further includes a unitary gate body member 96 that is symmetrically formed with respect to a pair of mutually perpendicular planes both of which include the axis of the stem 55. The unitary gate body member 96 has an axial cylindrical portion 98. At the end opposite said axial cylindrical portion 98 the unitary member 96 has a flat surface 102 which is perpendicular to the axis of said axial cylindrical portion 98. Flat surface 102 of member 96 is adapted to cooperate with the corresponding flat surface 25 in the body section 16 of the valve. The unitary gate body member 96 has a lower portion 106 (Fig. 1) which portion 106 is characterized by a pair of opposed circular end perimeters 108 and 109 (Fig. 3). Between the ends of the portion 106 defined by said circular perimeters 108 and 109 and on each side of the axial portion 98 there are provided two pairs of projections 112 and 113 (Fig. 1 and Fig. 5) forming guiding channels for registration with the opposed guide ribs 26 and 27 in the body 16 of the valve. The projections 112 and 113 and the guide ribs 27, 26 in housing section 16 serve to restrict the gate assembly 54 to reciprocating movement with respect to the body 16 of the valve. Projecting from each end of the portion 106 of the unitary gate body member 96 are two pairs of gate face stops 116 and 118 (Figs. 3 and 5). The gate face stops 116 and 118 project beyond the circular rims 122 and 124 of the portion 106 of unitary gate body member 96. Each of the gate face stops is formed with a pair of transverse central holes 126 making it possible to machine a pair of frustro-conical openings 128 (Fig. 5) whose axes are perpendicular to the axes of the holes 126. Extending through the portion 106 parallel to the gate face stops 116 and 118 are coil spring passageways 132 and 134. The unitary gate body member 96 is further formed with an axial passage 136 (Fig. 1 and Fig. 8) through the axial portion 98. Starting from the free end of the axial portion 98 the axial passage 136 receives the compression spring cylindrical housing 93 and the compression-thrust and stem-locking washer 72. The passage 136 beyond that receiving the compression spring housing 93 and the washer 74 is stepped down to a reduced diameter to form a hydraulic cylinder 142, terminating at 144. Beyond the end 144 of the hydraulic cylinder 142 and the end wall 146 there is formed in the unitary member 96 a transverse passage 148. The transverse passage 148 permits communication between the opposed rims 122 and 124 of the portion 106 of the unitary gate body member 96. The wall 146 at the bottom of the hydraulic cylinder 142 is bored to form openings 152 in the end wall 146 of the hydraulic cylinder whereby the axial passage 136 communicates with the opposed ends of the portion 106.

On the step in the axial passage 136 where the axial passage reduces to a smaller diameter to form the hydraulic cylinder 142, there are fixedly secured four equally-spaced longitudinally disposed pins 154 (Fig. 8). Adjacent the free end of the axial portion 98, the unitary gate body member 96 (Fig. 6) is formed with two annular grooves 156 and 158 to receive a snap ring 162 and an O ring packing 164, respectively. The snap ring 162 and retaining washer 95a secure the spring housing 93 in the unitary gate body member 96.

A pair of circular disks 172 and 174 (Fig, 3) are provided for each end of the portion 106 of the unitary gate body member 96 and serve as the gate faces for the valve. Each of the disks has one face which is perpendicular to its axis and an opposite face which is at a slight angle to the angle corresponds to the angle of the taper of the valve seats 22 and 24. Each of the disks 172, 174 is centrally formed with a partially tapped opening 176 (Fig. 2) terminating in a frustro-conical constriction 178. The tapped opening 176 and the frustro-conical constriction 178 permits charging the gate assembly with hydraulic fluid. An annular groove 182, substantially V-shaped in cross section, is cut in the peripheral surface of each disk at a uniform distance from the tapered face.

Each of the disks 172, 174 is recessed at four spaced points corresponding to the location of the frusto-conical depressions 128 in the gate face stops 116 and 118 to provide cylindrical depressions 201 (Fig. 4). Force fitted or silver soldered into the cylindrical depressions 201 of each disc are conical aligning studs 202. Each disk is drilled to provide two holes 203 (Fig. 5).

A replaceable seat ring 184 (Figs. 4 and 13) is provided for each disk 172, 174. The replaceable seat ring 184 is formed by vulcanizing or cementing rubber or a rubber-like material in the form of rings 186, 188 on each face of a metallic ring 192. The metallic ring 192 is provided with a plurality of readily deformable lips 194 for securing the seat rings to the disks.

The disks 172 and 174 are secured to the unitary gate body member by means of resilient annuli such as a pair of circular bellows 208 (Figs. 5 and 13). The flanges of the bellows are fixedly secured to the circular perimeters 108 and 112 of the unitary gate body member 96 and to the peripheral surfaces of the disks 172 and 174 by soldering, brazing, or the like. The bellows 208 each have a single convolution 212 directed radially inward. A pair of pretensioned retracting coil springs 214 and 216 terminating in ties 218 and 220 are connected to the two disks 172 and 174 by being soldered, brazed, or the like in the holes 203 of the discs. The conical aligning studs 202 are arranged for registration with the frustro-conical openings 128 in the gate face stops 116 and 118. Threaded sealing studs 222 and 224 terminating in conical ends are provided for each of the disks.

In order to prevent the convolutions 212 of the bellows from reversing themselves under pressures developed within the gate assembly 54, reinforcing rings 225 (Figs. 4, 10, 11, and 13) are mounted in the trough of each bellows. The reinforcing rings 225 comprise a pair of identical half rings 225a. Each of the half rings is substantially T-shaped in axial cross section. The cylindrical portions of each half ring 225a is formed with an annular groove 226 and a raised border 228. The ends of the half rings 225a are formed to provide for tongue and groove connections 230 (Figs. 10 and 11) to ensure proper alignment of the half ring. A girdling ring 231 surrounds the two half rings and a snap ring 232 is provided in the annular groove 226 retaining the elements of the reinforcing ring in assembled relationship in the trough of bellows 208.

A modified type of resilient annulus for use in place of the bellows 208 and reinforcing ring 224 of Fig. 3 is shown in Fig. 12. This modification includes a cylindrical channel 236 of resilient material such as rubber or rubber-like material, having a flange directed radially inward at each end for seating in the annular groove 238 in the peripheral surfaces 108 and 112 of the unitary gate body member 96 and in annular groove 240 in the disk 172 (or 174). The girdling ring 242 held in place by snap ring 244 prevents the resilient channel 236 from stretching radially outwardly under pressures developed within the gate assembly 54. It is to be noted that the disk 172 including the snap ring 244 move away from the girdling ring 242 under pressure developed within the gate assembly 54.

The parts of the gate assembly are assembled in the following order: one flange of each bellows 208 is soldered, brazed, or the like to the peripheral surfaces 108 and 112 of the unitary gate body member 96. The retractable coil springs 214 and 216 are then inserted into the coil spring passages 132 and 134 provided therefor. The replaceable seat rings 184 are secured to the tapered faces of the discs 172, 174 by means of a hand crimping tool which deforms the lips 194 of the replaceable seat rings 184 into the annular grooves 182 of the discs. With the disc 172 held in close proximity to the unitary gate body member 96 and with the reduced thickness side of the disc held adjacent the bottom of the unitary gate body member 96 the elongated ties 218 attached to the retractable coil springs 214 and 216 are threaded through the holes 203 in the disc 172. Then, with the conical aligning studs 202 of the disc 174 held in firm seating engagement within the frustro-conical openings 128 of the gate face stop 116 the other end of the adjacent bellows is soldered, brazed, or the like to its peripheral surface. Subsequently the ties 218 threaded through the holes 203 of the disc 174 are then soldered to the disc 174 with the extending ends of the ties cut away to leave a smooth surface on the tapered face of the disc 172.

After the disc 174 is secured to the unitary member 96 substantially the same procedure is followed for securing the circular disc 174 to the unitary gate body member 96. The only difference occurs when the ties on the opposite ends of the retractable coil springs 214 and 216 are to be soldered, brazed, or the like within the holes 203 of the disc 176. Before they are fixedly secured to the disc, the ties are attached to the end of a tension scale so as to tension the retractable coil springs 214 and 216, respectively, a predetermined amount and with the coil springs held under such predetermined tension the ties 220 are then soldered to the disc 174 with the free ends cut away to leave a smooth surface on the tapered face of the disc 174.

The stem 55 and its parts are next assembled by first slipping the compression coil spring 68 over the reduced end portion 59 of the stem 55 so that the one end of the coil spring is bearing against the flange 64 of the stem. The compression thrust and stem locking washer 72 follows the compression coil spring 68 onto the stem 55. The piston assembly 75 including the washer 76, the channel-shaped rubber ring 77, the cup-shaped retaining ring 78 is then mounted on the reduced end 59 of the stem 55 and secured thereon by means of the snap ring 62 in the annular groove 60. When the foregoing elements are thus assembled on the stem 55 the compression coil spring 68 is slightly compressed. The stem 55 having its associated elements assembled thereto is then inserted into the axial passage 136 of the unitary gate body member 96. When the compression-thrust and stem-locking washer 72 come into abutment with the pins 154 on the step of axial passage 136 the stem is rotated until the holes 73 in the washer 72 come into registration with the pins 154 and the washer 72 seats against the step upon which the pins 154 are mounted. The spring housing 93 is slipped over the threaded end of the stem and the axial passage 136 after the O ring packing 164 is inserted in the annular groove 158 in the cylindrical axial passage 136. The O ring 95 followed by the retaining washer 95a is then slipped onto the stem 55 subsequent to the housing 93. Snap ring 162 inserted into the annular groove 156 secures the spring housing 93 in the axial passage 136.

The reinforcing rings 225 one for each of the bellows 208 are then assembled in the trough of each bellows. The pair of half rings 225a included in each of the reinforcing rings 225 are seated in the trough of the associated bellows 208 with the tongue and groove connections 230 properly engaged. The girdling ring 231 is slipped over the two half rings and secured by means of a snap ring 232. The same is repeated for the other bellows 208.

The gate assembly 54 is next dropped into the lower body section 16. After an O ring packing is seated in the annular groove 30 formed in the flange 28 of the body section 16 of the housing bonnet 14 is slipped over the stem 55 until the bonnet contacts the flange 28 of the valve body section 16. Bolts and nuts 31 secure the bonnet 14 to the body section 16. An O ring packing 252 followed by a retaining washer 254 are then slipped over the stem and into the groove provided for the O ring and the retaining washer, respectively, in the top of bonnet 14. The retaining washer 254 is secured by means of a plurality of machine screws 256.

The valve actuating means is next assembled to the valve. The sub assembly of the valve actuating means including the yoke sleeve 48 and the handwheel 51 keyed thereto are seated firmly against the flange 49 of the yoke sleeve 48 by means of the yoke sleeve nut 53 threaded onto the stem 55. The yoke sleeve 48 is rotated on the stem 55 until it is at the proper height above the bonnet for correct assembly with the brackets 39 and 40. The brackets 39 and 40 are then mounted on the bonnet with their upper portions forming the yoke sleeve housing and encircling the yoke sleeve 48. The bolts and nuts 41 secure the brackets 39 and 40 to the bonnet 14 and additional bolts and nuts 46 secure the two semicircular portions of the yoke sleeve housing to one another. The valve is now completely assembled and includes a sealing plug 58 in the end of the stem 55 and sealing plugs 222, 224 in the circular discs 172, 174 of the gate.

The gate assembly 54 is filled with a suitable non-compressible hydraulic fluid and wherever possible the hydraulic fluid within the gate assembly is the same as that in the pipe line of which the valve 10 forms a part. To fill the gate assembly with the hydraulic fluid any two of the sealing plugs 58, 222, and 224 are removed from their openings and with one of the two openings serving as a vent the fluid is poured into the other opening until it proceeds to overflow from the venting opening. For example, assume that the opening at the top of the stem serves as a venting opening. With the valve upright as shown on the drawings, hydraulic fluid is poured in the other opening by means of a suitable pipe and fitting until the fluid overflows from the opening at the top of the stem 55. The plug 58 at the top of stem 55 is then reinserted in its opening, the valve tilted, and the pipe and fitting removed for inserting the other plug. The valve is shaken a few times and then layed over on one of the sides so that another opening is uppermost. The sealing stud is then removed from the uppermost opening and more fluid is poured into the valve assembly until it overflows from the opening into which it is being poured. The plug is reinserted and the operation is repeated for the other of the three plugged openings. After repeating this filling operation several times it may be readily assumed that substantially all the air has been replaced by hydraulic fluid.

In operation when the valve is included in a pipe line, not shown, it may be used not only to terminate fluid flow through the pipe line but also substantially all leakage past the valve. Reference is made to the valve-open position in Fig. 1, the valve-seated position in Figs. 2 and 3, and the valve-closed position as shown in Fig. 4. In Fig. 1 the gate assembly 54 is completely withdrawn so that its axial cylindrical portion 98 is at the upper limit of the bonnet 14. In this position the compression coil spring 68 on stem is expanded as far as is permitted between the flange 64 on the stem 55 and the compression-thrust and stem-locking washer 72 whereby the piston assembly 75 at the end of the stem 55 is in its most withdrawn position relative to the hydraulic cylinder 142. To close the valve the handwheel 51 is rotated thereby rotating the yoke sleeve 48 in the yoke sleeve housing 42. Through threaded engagement between the projecting end 52 of the yoke sleeve 48 and the stem 55 the stem is caused to move axially into the valve housing. The compression coil spring 68 is sufficiently stiff to transfer force from the stem directly to the gate assembly 54 whereby the compression coil spring 68 remains expanded as the stem 55 moves inwardly even against the resistance offered by fluid flowing through the valve. When the flat surface 102 on the bottom of the gate assembly 554 comes into engagement with the stop 25 substantially all flow through the valve is terminated. Continued rotation of the handwheel 51 forces the stem 55 to move further inward. The further inward movement of the stem 55 causes the piston assembly 75 to move into the hydraulic cylinder 142 displacing the hydraulic fluid therefrom to cause a pressure increase within the gate assembly 54. As the pressure increases within the gate assembly 54 the circular discs 172, 174 are forced to move outwardly relative to the gate assembly 54 out of abutting engagement with the gate face stops 116 and 118 against the bias of coil springs 214 and 216. As the pressure is increased within the gate assembly the circular discs and more specifically the replaceable seat rings 184 are forced into sealing engagement with the valve seats 22 and 24. All leakage of fluid past the valve ceases.

It is to be noted that no increase of the fluid pressure within the gate assembly 54 occurs until the bottom flat surface 102 of the gate assembly abuts the stop 25 at the bottom of the valve housing 16 because the retractable coil springs 214, 216 have been pretensioned to bias the circular discs 172, 174 into engagement with the gate face stops 116 and 118. The gate assembly moves freely and easily into closed position with the flat surface 102 of the unitary gate body member 96 abutting the stop 25 before the circular discs 172, 174 move outwardly relative to the gate assembly.

When the valve is opened the reverse occurs. Initial turning of the handwheel 51 permits the stem 55 and thereby the piston assembly 75 to be withdrawn under the urging of the compression spring 68. The initial outward movement of the stem 55 permits the piston assembly 75 to be withdrawn to the upper limit of the hydraulic cylinder 142. Further rotation of the handwheel 51 causes the gate assembly 54 to be withdrawn from the valve seats.

The seating rings 192 are replaced after wear permits fluid to leak though the valve is in the operating condition of Fig. 4.

Though this valve has been described with the gate assembly including two discs 172, 174 that are movable relative to the gate assembly it is to be understood that it is within the purview of this invention that either one movable disc or more than two movable discs can be included in a valve of this type.

Obviously many modifications and variations of the present invention are possible in the light of the above teachings. It is therefore to be understood that within the scope of the appended claims the invention may be practiced otherwise than as specifically described.

I claim:

1. A gate assembly for a valve comprising a stem, a body member formed with a hydraulic cylinder, the head end of the hydraulic cylinder of said body member being formed with an opening for permitting fluid communication between the hydraulic cylinder of said body member and the remainder of the interior of said body member, a piston secured to one end of said stem for reciprocation in the hydraulic cylinder of said body member, a plurality of gate faces for sealing the interior of said body member, resilient annular means for movably mounting at least one of said gate faces on said body member, said resilient annular means including a resilient annulus, said resilient annulus having opposed end portions connected in sealed relationship to said one gate face and said body member respectively, a reinforcing ring surrounding the resilient annulus to prevent said resilient annulus from expanding radially outward under pressures created within the body member by said piston, said reinforcing ring not interfering with movement of said movable gate face relative to said unitary body member, hydraulic fluid included within said body member whereby reciprocation of said stem within said body member causes said piston to increase the pressure within said hydraulic fluid to move the movable gate face relative to said body member, and a replaceable seat ring secured to each of said gate faces.

2. A gate assembly for a valve having at least two valve ports, said gate assembly comprising a stem, a unitary body member, said stem being operatively associated with said unitary body member, one end of said stem adapted to reciprocate within said unitary body member, a piston assembly on said end of said stem in said unitary body member, a pair of gate faces movably mounted on said unitary body member and adapted to be forcibly moved outwardly relative to said unitary body member for sealing valve ports in the valve, hydraulic means associated with said stem and said unitary body member and adapted to have induced therein pressures by said piston assembly on said stem when the latter reciprocates relative to said unitary body member, the pressures being transferable by said hydraulic means to said gate faces, means normally acting to retract said gate faces relative to said unitary body member, resilient annular means for movably mounting said gate faces on said unitary body member including resilient annuli, said resilient annuli having opposed end portions connected in sealed relationship to said gate faces and said unitary body member respectively, reinforcing rings surrounding the resilient annuli to prevent the resilient annuli from expanding radially outward under pressures formed within said hydraulic means, said reinforcing rings not interfering with movement of said gate faces relative to said unitary body member, and a replaceable seat ring secured to each of said gate faces.

3. A gate assembly for a valve having at least two valve ports, said gate assembly comprising a stem, a unitary body member, said stem being operatively associated with said unitary body member, one end of said stem adapted to reciprocate within said unitary body member, a piston assembly on said end of said stem on said unitary body member, a pair of gate faces movably mounted on said unitary body member and adapted to be forcibly moved outwardly relative to said unitary body member for sealing valve ports in the valve, hydraulic means associated with said stem and said unitary body member and adapted to have induced therein pressures by said piston assembly on said stem when the latter reciprocates relative to said unitary body member, the pressures being transferable by said hydraulic means to said gate faces, means normally acting to retract said gate faces relative to said unitary body member, resilient annular means for movably mounting said gate faces on said unitary body member including resilient annuli, said resilient annuli having opposed end portions connected in sealed relationship to said gate faces and said unitary body member respectively, reinforcing rings surrounding the resilient annuli to prevent the resilient annuli from expanding radially outward under pressures formed within said hydraulic means, said reinforcing rings not interfering with movement of said gate faces relative to said unitary body member, and a replaceable seat ring secured to each of said gate faces, each replaceable seat ring including a plurality of laminations, each of the laminations having a flat ring-like portion, said plurality of laminations including at least a central metallic lamination and an outside lamination of a rubber-like material on each side of said metallic lamination.

4. A gate assembly for a valve having at least two valve ports, said gate assembly comprising a stem, a body member, one end of said stem being operatively associated with said body member, a pair of gate faces movably mounted on said unitary body member and adapted to be forcibly moved outwardly relative to said body member for sealing valve ports in the valve, means associated with said stem and said unitary body member and adapted to have induced therein forces which are transferable by said means to said gate faces, means normally acting to retract said gate faces relative to said body member, resilient annular means for movably mounting said gate faces on said unitary body member, said resilient annular means including resilient annuli, said resilient annuli having opposed end portions connected in sealed relationship to said gate faces and said body member respectively, reinforcing rings surrounding said resilient annuli to prevent said resilient annuli from expanding radially outward under pressures formed within said resilient annuli, said reinforcing rings not interfering with movement of said gate faces relative to said body member, and a replaceable seat ring secured to each of said gate faces, each replaceable seat ring including a plurality of laminations, each of said laminations having a flat ring-like portion, said plurality of laminations including at least a central metallic lamination and outside laminations of a material that is resiliently deformable and substantially impervious to the fluid controllable by the valve, one of said outside laminations on each side of said metallic lamination.

5. A valve comprising a housing including a body section having an inlet port and an outlet port, guiding ribs formed in said body section, a bonnet secured to said body section and having a cylindrical axial extension, a yoke forming a sleeve housing mounted on said bonnet; operating means for the valve including a sleeve, said sleeve being internally threaded from one end for part of its length and being of increased inside diameter for the remainder of its length, said sleeve also having a pair of integral flanges on the outside thereof and located at opposite ends of the part of said sleeve formed with the increased inside diameter, the end of said sleeve spaced from the flanges being externally threaded, a handwheel on said sleeve between the externally threaded portion and one flange, a locknut to fixedly secure said handwheel to said sleeve; a gate assembly mounted in said housing and adapted to assume one position where it is withdrawn into the cylindrical axial extension of the bonnet, said gate assembly including a stem, the end of said stem being threaded for engagement with the internally threaded part of said sleeve, a body member having guiding channels for registration with said guiding ribs in said housing for restricting the gate assembly to reciprocating movement, the other end of said stem being operatively connected to said body member, a pair of gate faces movably mounted on said body member and adapted to be forcibly moved relative to said body member to seal the ports in said housing; means associated with said stem and said unitary body member adapted to have induced therein forces which are transferable by said means to said gate faces; means normally acting to retract said gate faces relative to said unitary body member; resilient annular means for movably mounting said gate faces on said body member including resilient annuli, said resilient annuli having opposed end portions connected in sealed relationship to said gate faces and said body member respectively, reinforcing rings surrounding said resilient annuli to prevent said resilient annuli from expanding radially outward under pressures formed within the resilient annuli; said reinforcing rings not interfering with movement of said gate faces relative to the body member; and a replaceable seat ring secured to each of said gate faces, each replaceable seat ring including a plurality of laminations, each of said laminations having a flat ring-like portion, said plurality of laminations including at least a central metallic lamination and an outside lamination of a rubber-like material on each side of said metallic lamination.

6. A resilient annular means for movably mounting a gate face on a body member of a gate assembly of a valve comprising a bellows, said bellows having at least one convolution directed radially inward and a pair of opposed cylindrical end portions adapted to be connected in sealed relationship with a gate face and to a body of a gate assembly respectively, a reinforcing ring mounted in the convolution of said bellows, said reinforcing ring including a pair of half rings each of which is substantially T-shaped in cross section, the inwardly directed flange forming the leg of the T of said half rings in cross section having an inside diameter which is generally of the same magnitude as the diameter of the trough of the bellows convolution, and a girdling ring whose inside diameter is such that it can be assembled over said two half rings to retain said half rings in assembled relationship in the bellows convolution for preventing pressures developed inside the bellows from forcing the bellows convolution to reverse itself.

7. A resilient annular means for movably mounting a gate face on a body member of a gate assembly of a valve comprising a circular cylinder of a resilient deformable material which is impervious to the particular hydraulic fluids associated therewith in operation, said circular cylinder having a flange directed radially inward at each end thereof, each of the flanges being adapted to seat in annular grooves of a gate face and a body member of a gate assembly respectively and further adapted to be bonded in sealed relationship to both, and a girdling ring having an inside diameter which is substantially equal to the outside diameter of said circular cylinder, said girdling ring being movable relative to the circular cylinder whereby a gate face secured to a body member of a gate assembly by said resilient annular means may move relative to the body member but said circular cylinder does not expand radially outward under pressures formed internally of said circular cylinder.

8. A gate assembly for a valve comprising a body member having an interior that is formed with a hydraulic cylinder and with space about said hydraulic cylinder, said hydraulic cylinder being formed with an opening for permitting fluid communication between said hydraulic cylinder and said space about said hydraulic cylinder, a reciprocable piston in said hydraulic cylinder, a plurality of gate faces secured to said body member and sealing the interior of said body member, resilient annular means securing at least one of said gate faces on said body member whereby said one gate face is movable toward and away from said body member, said resilient annular means including a resilient annulus having opposed end portions connected in sealed relationship to said one gate face and said body member respectively, hydraulic fluid included within said hydraulic cylinder and said space about said hydraulic cylinder whereby movement of said piston in one direction causes the pressure within said hydraulic fluid to increase to move said gate face away from said body member, and a reinforcing ring surrounding said resilient annulus to prevent said resilient annulus from expanding radially outward when pressure in said fluid increases, said reinforcing ring not interfering with movement of said one gate face toward and away from said body member.

9. A gate assembly for a valve comprising a body member formed with an interior space whose volume is increasable and reducible, means coupled to said body member for increasing and reducing the volume of said space, a gate face secured to said body member and sealing the interior of said body member, resilient annular means securing said gate face on said body member whereby said gate face is movable toward and away from said body member, said resilient annular means including a resilient annulus having opposed end portions connected in sealed relationship to said gate and said body member respectively, hydraulic fluid included within the interior of said body member, whereby movement of said means to reduce the volume of said space causes the pressure within said hydraulic fluid to increase to move said gate face away from said body member, and a reinforcing ring surrounding said resilient annulus to prevent said resilient annulus from expanding radially outward when pressure in said fluid increases, said reinforcing ring not interfering with movement of said one gate face toward and away from said body member.

References Cited in the file of this patent

UNITED STATES PATENTS

| | | |
|---|---|---|
| 686,703 | Bickford | Nov. 19, 1901 |
| 978,927 | O'Malley | Dec. 20, 1910 |
| 1,476,862 | Wagner | Dec. 11, 1923 |
| 1,538,108 | Hagey | May 19, 1925 |
| 1,541,465 | Belknap | June 9, 1925 |
| 1,667,999 | Appleton | May 1, 1928 |
| 1,712,882 | Gleason | May 14, 1929 |
| 2,298,632 | Tharner | Oct. 13, 1942 |
| 2,390,201 | Bredenbeck | Dec. 4, 1945 |
| 2,705,610 | Hjulian | Apr. 5, 1955 |

FOREIGN PATENTS

| | | |
|---|---|---|
| 528,548 | Germany | of 1931 |
| 593,945 | Germany | Apr. 26, 1933 |
| 711,187 | Germany | of 1941 |